(12) United States Patent
Wang et al.

(10) Patent No.: US 11,154,869 B2
(45) Date of Patent: Oct. 26, 2021

(54) DEVICE FOR PULVERIZATION AND EXPLOSION SUPPRESSION OF LOW CARBON GAS HYDRATE

(71) Applicant: Henan Polytechnic University, Jiaozuo (CN)

(72) Inventors: Lanyun Wang, Jiaozuo (CN); Yongliang Xu, Jiaozuo (CN); Yang Liu, Jiaozuo (CN); Zhendong Li, Jiaozuo (CN); Huilong Xie, Jiaozuo (CN); Xuanxuan Huang, Jiaozuo (CN); Menglei Chen, Jiaozuo (CN)

(73) Assignee: Henan Polytechnic University, Jiaozuo (CN)

( * ) Notice: Subject to any disclaimer, the term of this patent is extended or adjusted under 35 U.S.C. 154(b) by 187 days.

(21) Appl. No.: 16/535,462

(22) Filed: Aug. 8, 2019

(65) Prior Publication Data

US 2020/0238295 A1    Jul. 30, 2020

(30) Foreign Application Priority Data

Jan. 30, 2019 (CN) .......................... 201910089131.4

(51) Int. Cl.
| | |
|---|---|
| *B02C 19/06* | (2006.01) |
| *B01D 46/54* | (2006.01) |
| *B02C 19/00* | (2006.01) |
| *B02C 23/12* | (2006.01) |
| *B01D 46/00* | (2006.01) |

(Continued)

(52) U.S. Cl.
CPC ........ *B02C 19/061* (2013.01); *B01D 46/0093* (2013.01); *B01D 46/543* (2013.01); *B02C 19/0056* (2013.01); *B02C 23/12* (2013.01); *B01D 2279/00* (2013.01)

(58) Field of Classification Search
CPC ... B02C 19/061; B02C 19/0056; B02C 19/06; B02C 23/12; B02C 23/04; B01D 46/0093; B01D 46/543; B01D 2279/00; A62C 3/04
USPC ..................................................... 241/31, 39
See application file for complete search history.

(56) References Cited

U.S. PATENT DOCUMENTS 2,032,827 A * 3/1936 Andrews ............... B02C 19/061
241/5
3,254,848 A * 6/1966 Stephanoff ............... C08K 3/04
241/39

(Continued)

*Primary Examiner* — Faye Francis
*Assistant Examiner* — Mohammed S. Alawadi
(74) *Attorney, Agent, or Firm* — Troutman Pepper Hamilton Sanders LLP; Christopher C. Close, Jr.

(57) ABSTRACT

The present invention discloses a device for pulverization and explosion suppression of low carbon gas hydrate (LCGH). A feeding chamber connects with a pulverizing chamber, and the chambers communicate through a feed port. A pulverizing air pipe and the feeding chamber communicate through a feeding air pipe; two ends of a venturi connect with an entrainment chamber and a disperser respectively; and a gas-solid separation membrane (GSSM) is disposed on a discharging port and used for preventing LCGH powder from entering the entrainment chamber from the pulverizing chamber. When an explosion is triggered, the GSSM is opened to make the LCGH powder enter the entrainment chamber. The device can store and pulverize the LCGH and spray LCGH powder to achieve combustion and explosion suppression.

10 Claims, 1 Drawing Sheet

(51) Int. Cl.
*A62C 3/04* (2006.01)
*B02C 23/04* (2006.01)

(56) References Cited

U.S. PATENT DOCUMENTS

| | | | | | |
|---|---|---|---|---|---|
| 3,312,342 | A | * | 4/1967 | Brown | B01J 8/0065 209/3 |
| 3,462,086 | A | * | 8/1969 | Bertrand | B02C 19/061 241/5 |
| 3,614,000 | A | * | 10/1971 | Blythe | B02C 19/061 241/5 |
| 3,643,875 | A | * | 2/1972 | Dille | B01J 2/00 241/5 |
| 3,688,991 | A | * | 9/1972 | Andrews | B02C 19/06 241/5 |
| 4,304,360 | A | * | 12/1981 | Luhr | B02C 19/06 241/19 |
| 4,451,005 | A | * | 5/1984 | Urayama | B02C 19/061 241/152.1 |
| 4,641,787 | A | * | 2/1987 | Petersen | B02C 19/0025 241/18 |
| 4,962,893 | A | * | 10/1990 | Bochmann | B02C 19/06 241/5 |
| 5,967,429 | A | * | 10/1999 | Ulfik | B02C 19/06 241/33 |
| 6,196,482 | B1 | * | 3/2001 | Goto | B02C 19/06 241/39 |
| 7,258,290 | B2 | * | 8/2007 | Taketomi | B02C 19/063 241/40 |
| 8,733,680 | B2 | * | 5/2014 | Lin | B02C 19/061 241/39 |
| 2004/0040178 | A1 | * | 3/2004 | Coles | B02C 19/06 34/591 |
| 2004/0169098 | A1 | * | 9/2004 | Olson | B02C 19/061 241/39 |
| 2008/0029625 | A1 | * | 2/2008 | Talton | B02C 19/06 241/21 |
| 2008/0173739 | A1 | * | 7/2008 | Meier | B02C 19/068 241/19 |
| 2009/0206186 | A1 | * | 8/2009 | Morrison | B02C 19/061 241/24.16 |
| 2012/0202063 | A1 | * | 8/2012 | Logue | B02C 19/068 428/402 |
| 2013/0020421 | A1 | * | 1/2013 | Lin | B02C 19/061 241/5 |
| 2014/0334962 | A1 | * | 11/2014 | Sun | H01F 41/0273 419/28 |
| 2015/0246357 | A1 | * | 9/2015 | Mersmann | B02C 15/001 241/18 |

* cited by examiner

DEVICE FOR PULVERIZATION AND EXPLOSION SUPPRESSION OF LOW CARBON GAS HYDRATE

This application claims priority to Chinese application number 201910089131.4, filed Jan. 30, 2019, with a title of DEVICE FOR PULVERIZATION AND EXPLOSION SUPPRESSION OF LOW CARBON GAS HYDRATE. The above-mentioned patent application is incorporated herein by reference in its entirety.

TECHNICAL FIELD

The present invention relates to an explosion suppression device, and in particular to a device for pulverization and explosion suppression of a low carbon gas hydrate.

BACKGROUND

Gas hydrates are a type of cage crystal formed by gas and water under low temperature and high pressure conditions. The gas hydrates are characterized by having large gas storage capacity and being convenient to transport and safe to use. Low carbon gas hydrate powder containing explosion suppression components is environmentally friendly and has an explosion suppression effect. The main bottleneck for applying the low carbon gas hydrates to the suppression of fires and explosions is the preparation, storage and spray of hydrate powder. If the low carbon gas hydrate is first pulverized and powdered, then taken out and placed in an ejector, the hydrate powder is easily decomposed in the process and an ice surface is easily formed on the surface thereof, which causes the hydrate to agglomerate, making it difficult to ensure that the powder can be sprayed out in time when fires and explosions occur. In order to solve problems of powder decomposition and powder spray channel clogging of the low carbon hydrate powder and the like during the explosion suppression process, an explosion suppression device capable of efficiently preparing, storing and spraying gas hydrate powder is urgently needed.

SUMMARY

An objective of the present invention is to provide a device for pulverization and explosion suppression of a low carbon gas hydrate, to solve the problems of the prior art described above. The device for pulverization and explosion suppression of a low carbon gas hydrate can store and pulverize the low carbon gas hydrate and spray low carbon gas hydrate powder to achieve combustion and explosion suppression.

To achieve the above purpose, the present invention provides the following technical solution.

The present invention provides a device for pulverization and explosion suppression of a low carbon gas hydrate, including: a pulverizing chamber, a feeding chamber, a pulverizing air pipe, a venturi, a nozzle, and a gas-solid separation membrane, where the pulverizing chamber is provided at the top thereof with a discharging port, and the discharging port is connected with an entrainment chamber; the feeding chamber is connected with a side wall of the pulverizing chamber, the feeding chamber is provided with a feeding port, the feeding port is provided with a sealing cover that can be opened or closed, the pulverizing chamber is in communication with the feeding chamber through a feed port, a switching valve is disposed at the position of the feed port, and the switching valve is used for opening or closing the feed port; the pulverizing air pipe ventilates the pulverizing chamber, a high-speed airflow can be formed in the pulverizing chamber to pulverize a low carbon gas hydrate solid in the pulverizing chamber, the pulverizing air pipe is in communication with the feeding chamber through a feeding air pipe, and the pulverizing air pipe and the feeding air pipe are provided with a first valve and a second valve respectively; two ends of the venturi are connected with the entrainment chamber and a disperser respectively, and the pulverizing chamber, the entrainment chamber, the venturi and the disperser are sequentially in communication with each other; the nozzle extends into the entrainment chamber and can spray an airflow into the entrainment chamber; and the gas-solid separation membrane is disposed on the discharging port and used for preventing low carbon gas hydrate powder from entering the entrainment chamber from the pulverizing chamber, and when an explosion is triggered, the gas-solid separation membrane can be opened to make the low carbon gas hydrate powder enter the entrainment chamber from the pulverizing chamber under the action of the airflow.

Preferably, the device for pulverization and explosion suppression of a low carbon gas hydrate further includes an annular pipe, where the annular pipe sleeves the pulverizing chamber, and the annular pipe is connected with the pulverizing air pipe; the annular pipe is in communication with the pulverizing chamber through a plurality of ventilation pipes, and the ventilation pipes are tangential to the inner side wall of the pulverizing chamber so that a spiral airflow can be formed in the pulverizing chamber.

Preferably, the device for pulverization and explosion suppression of a low carbon gas hydrate further includes a cooling wrapping cover, where the cooling wrapping cover is filled with a cooling medium; and the cooling wrapping cover wraps the annular pipe, the pulverizing chamber, the venturi, the nozzle, the entrainment chamber and the feeding chamber to make the low carbon gas hydrate solid maintain a stable low temperature state.

Preferably, a cooling medium inlet and a cooling medium outlet are disposed on the cooling wrapping cover; the cooling medium inlet and the cooling medium outlet are connected with an outlet and an inlet of an external cooling medium storage box respectively, and the cooling medium inlet and the cooling medium outlet are provided with a third valve and a fourth valve respectively.

Preferably, the outer wall of the cooling wrapping cover is provided with a heat insulation layer.

Preferably, one end of the gas-solid separation membrane is hinged to the inner wall of the discharging port, and the other end is clamped on the inner wall of the discharging port.

Preferably, the device for pulverization and explosion suppression of a low carbon gas hydrate further includes an intake manifold, where the pulverizing air pipe and the feeding air pipe are in communication with the intake manifold; the intake manifold is provided with a first flow control instrument; the nozzle is connected with a nozzle air pipe, and the nozzle air pipe is provided with a fifth valve and a second flow control instrument.

Preferably, a pressure sensor is fixedly disposed on the inner wall of the venturi.

Preferably, one end of the switching valve is hinged to the inner wall of the feed port, and the other end is magnetically adsorbed and connected with the inner wall of the feed port.

Preferably, the two ends of the venturi are in threaded connection with the entrainment chamber and the disperser respectively.

The present invention achieves the following technical effects compared with the prior art:

The device for pulverization and explosion suppression of a low carbon gas hydrate provided by the present invention can achieve the preparation and storage of low carbon gas hydrate powder; when an explosion is triggered, the low carbon hydrate is subjected to one-time pulverization in a pulverizing chamber; through a high-pressure high-speed airflow, the collision and friction between the low carbon gas hydrate and the inner wall of the pulverizing chamber and between low carbon gas hydrates are accelerated, and the pulverizing efficiency and utilization rate of the low carbon hydrate are improved; secondary pulverization and quick spray of the low carbon gas hydrate powder are achieved by using a venturi; a disperser can adjust the spray range of the low carbon hydrate powder, effectively solving the problem of powder decomposition and powder spray channel clogging of the low carbon hydrate powder and the like during the explosion suppression process; the low carbon hydrate powder can be efficiently prepared, stored and sprayed, and the combustion suppression and explosion suppression are achieved by spraying the low carbon hydrate powder.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

In the figure: 1. annular pipe, 2. pulverizing chamber, 3. disperser, 4. venturi, 5. nozzle, 6. entrainment chamber, 7. placing port, 8. cooling wrapping cover, 9. pulverizing air pipe, 10. nozzle air pipe, 11. ventilation pipe, 12. feeding air pipe, 13. cooling medium inlet, 14. cooling medium outlet, 15. third valve, 16. fourth valve, 17. fifth valve, 18. first valve, 19. second valve, 20. switching valve, 21. first flow control instrument, 22. second flow control instrument, 23. pressure sensor, 24. sealing cover, 25. gas-solid separation membrane, 26. magnetic block, 27. intake manifold, 28. feeding chamber.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a device for pulverization and explosion suppression of a low carbon gas hydrate, to solve the problems of the prior art described above. The device for pulverization and explosion suppression of a low carbon gas hydrate can store and pulverize the low carbon gas hydrate and spray low carbon gas hydrate powder to achieve combustion and explosion suppression.

To make the foregoing objective, features, and advantages of the present invention clearer and more comprehensible, the present invention is further described in detail below with reference to the accompanying drawings and specific embodiments.

Figure 1:
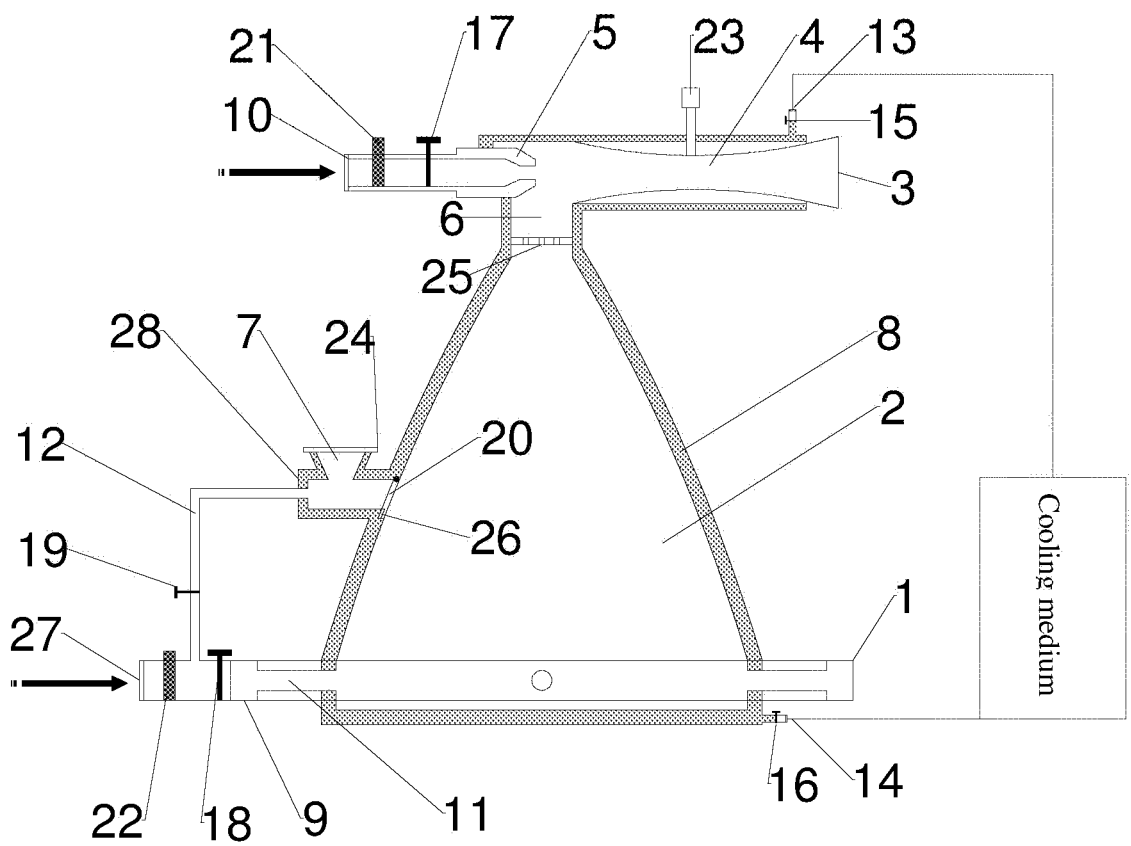
FIG. 1 is a schematic structural view of a device for pulverization and explosion suppression of a low carbon gas hydrate according to the present invention.
Figure 2:
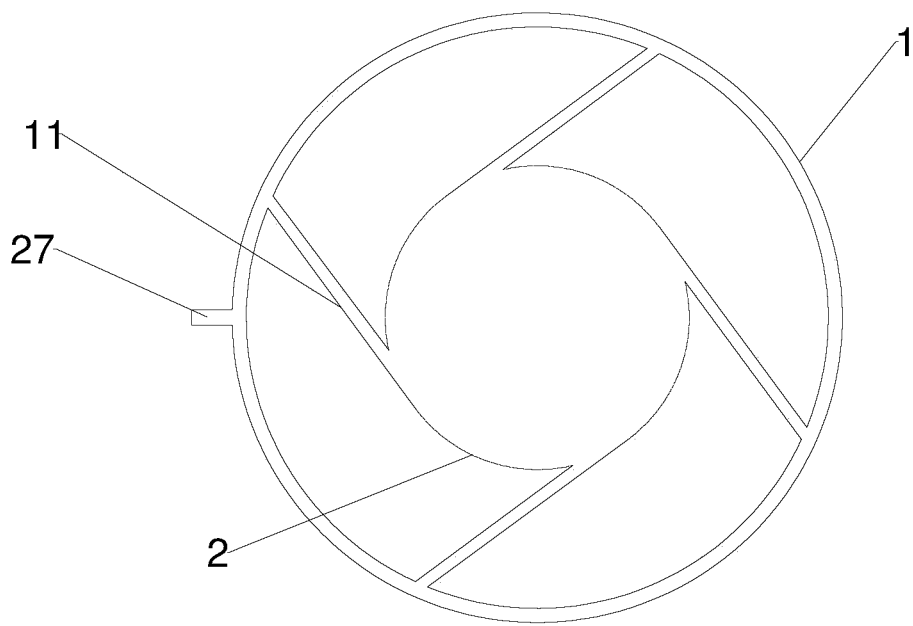
FIG. 2 is a connecting structure view of an annular pipe and a pulverizing chamber of a device for pulverization and explosion suppression of a low carbon gas hydrate according to the present invention.

As shown in FIGS. 1-2, the present invention provides a device for pulverization and explosion suppression of a low carbon gas hydrate. In a specific embodiment of the present invention, the device for pulverization and explosion suppression of a low carbon gas hydrate includes a pulverizing chamber 2, a feeding chamber 28, a pulverizing air pipe 9, a venturi 4, a nozzle 5, and a gas-solid separation membrane 25, where the pulverizing chamber 2 is provided at the top thereof with a discharging port connected with an entrainment chamber 6; the feeding chamber 28 is connected with a side wall of the pulverizing chamber 2, and the feeding chamber 28 is provided with a feeding port provided with a sealing cover 24 that can be opened or closed; the pulverizing chamber 2 is in communication with the feeding chamber 28 through a feed port, a switching valve 20 is disposed at the position of the feed port, and the switching valve 20 is used for opening or closing the feed port; the pulverizing air pipe 9 ventilates the pulverizing chamber 2, and a high-speed airflow can be formed in the pulverizing chamber 2 to pulverize a low carbon gas hydrate solid in the pulverizing chamber 2; the pulverizing air pipe 9 is in communication with the feeding chamber 28 through a feeding air pipe 12, and the pulverizing air pipe 9 and the feeding air pipe 12 are provided with a first valve 18 and a second valve 19 respectively; two ends of the venturi 4 are connected with the entrainment chamber 6 and the disperser 3 respectively, and the pulverizing chamber 2, the entrainment chamber 6, the venturi 4 and the disperser 3 are sequentially in communication with each other; the nozzle 5 extends into the entrainment chamber 6 and can spray airflow into the entrainment chamber 6; the gas-solid separation membrane 25 is disposed on the discharging port and used for preventing low carbon gas hydrate powder from entering the entrainment chamber 6 from the pulverizing chamber 2, and when an explosion is triggered, the gas-solid separation membrane 25 can be opened to make the low carbon gas hydrate powder enter the entrainment chamber 6 from the pulverizing chamber 2 under the action of the airflow.

The device for pulverization and explosion suppression of a low carbon gas hydrate provided by the present invention can achieve the preparation and storage of low carbon gas hydrate powder: the second valve 19 is switched on, and the first valve 18 is switched off to introduce gas into the feeding air pipe 12; meanwhile, a blocky low carbon gas hydrate is placed in the feeding chamber 28 through the feeding port, the switching valve 20 can be manually switched on or controlled by a controller for switching on, and the switching valve 20 can also be set as a valve that can be switched on under the action of pressure of gas introduced by the pulverizing air pipe 9, so that the blocky low carbon gas hydrate placed in the feeding chamber 28 is carried by the gas introduced by the pulverizing air pipe 9 to enter the pulverization chamber 2, the introduced gas is discharged from the disperser 3 through the entrainment chamber 6 and the venturi 4, and the blocky low carbon gas hydrate is retained in the pulverizing chamber 2; the first valve 18 is switched on, the second valve 19 and the switching valve 20 are switched off, a high-pressure airflow is introduced into the pulverizing chamber 2 through the pulverizing air pipe 9, so that a high-speed airflow is formed in the pulverizing chamber 2, the high-speed airflow makes the blocky low carbon gas hydrates entering the pulverizing chamber 2 collide and pulverize to form low carbon gas hydrate particles, the gas is discharged through the entrainment chamber 6, the venturi 4 and the disperser 3, and a small amount of entrained low carbon gas hydrate particles are filtered out by the gas-solid separation membrane 25.

When an explosion is triggered, the nozzle 5 is opened, the nozzle 5 sprays the high-speed airflow, the first valve 18 is switched on, and compressed gas is introduced into the pulverizing chamber 2 through the pulverizing air pipe 9; pressure in the entrainment chamber 6 is drastically lowered, the gas-solid separation membrane 25 is opened upwards under the action of an up-and-down pressure differential; the gas-solid separation membrane 25 can also be controlled by the controller to be opened, the compressed gas enters the pulverizing chamber 2 through the pulverizing air pipe 9, and pressure energy is converted into kinetic energy to generate a high-speed airflow, so that the low carbon gas hydrate particles in the pulverizing chamber 2 are subjected to mutual fierce collision and friction and the collision with the surface of an inner chamber of the pulverizing chamber 2, thereby achieving the goal of superfine pulverization of the hydrate; the high-speed high-pressure airflow sprayed by the nozzle 5 makes a negative pressure formed at the position of the entrainment chamber 6, the low carbon hydrate powder is introduced to the position of the entrainment chamber 6 and is sprayed into the venturi 4 by the high-pressure airflow; the high-speed airflow in a throat pipe of the venturi 4 makes the low carbon hydrate powder subjected to fierce collision and pulverization again; the hydrate powder obtained after the pulverization is sprayed out of the outlet disperser 3 along with the airflow, and the powder particle size is in the range of 0.5-20 µm. The size of the spray range can be changed by adjusting the disperser 3.

The device for pulverization and explosion suppression of a low carbon gas hydrate provided by the present invention can achieve the preparation and storage of low carbon gas hydrate powder; when an explosion is triggered, the low carbon hydrate is subjected to one-time pulverization in a pulverizing chamber 2; through a high-pressure high-speed airflow, the collision and friction between the low carbon gas hydrate and the inner wall of the pulverizing chamber 2 and between low carbon gas hydrates are accelerated, and the pulverizing efficiency and utilization rate of the low carbon hydrate are improved; secondary pulverization and quick spray of the low carbon gas hydrate powder are achieved by using a venturi 4; and a disperser 3 can adjust the spray range of the low carbon hydrate powder, achieving the combustion suppression and explosion suppression by spraying the low carbon hydrate powder.

In another specific embodiment of the present invention, the device for pulverization and explosion suppression of a low carbon gas hydrate further includes an annular pipe 1, and the annular pipe 1 is preferably a circular ring-shaped pipe, the annular pipe 1 sleeves the pulverizing chamber 2, the annular pipe 1 is connected with the pulverizing air pipe 9, and the annular pipe 1 is in communication with the pulverizing chamber 2 through a plurality of ventilation pipes 11; the ventilation pipes 11 are tangential to the inner side wall of the pulverizing chamber 2 so that a spiral airflow can be formed in the pulverizing chamber 2, and there are preferably 4 ventilation pipes 11.

With the above structural configuration, after the compressed gas entering the annular pipe 1 from the pulverizing air pipe 9 passes through the ventilation pipe 11 tangential to the inner side wall of the pulverizing chamber 2, the pressure energy is converted into the velocity energy, so that a high-speed spiral airflow is generated in the pulverizing chamber 2; the airflow speed is controlled between 50-100 m/s, so that powdered material particles entering the pulverizing chamber 2 rotate, undergo mutual fierce collision and friction and collide with the surface of the inner chamber of the pulverizing chamber 2, thereby achieving the goal of superfine pulverization of the hydrate. The pulverized hydrate powder has a particle size between 0.5-20 µm.

In another specific embodiment of the present invention, in order to ensure that the low carbon gas hydrate powder in the annular pipe 1, the pulverizing chamber 2, the venturi 4, the nozzle 5, the entrainment chamber 6 and the feeding chamber 28 has a stable structure and does not decompose, the device for pulverization and explosion suppression of a low carbon gas hydrate further includes a cooling wrapping cover 8, and the cooling wrapping cover 8 is filled with a cooling medium; and the cooling wrapping cover 8 wraps the annular pipe 1, the pulverizing chamber 2, the venturi 4, the nozzle 5, the entrainment chamber 6 and the feeding chamber 28 to make the low carbon gas hydrate solid maintain a stable low temperature state. The cooling medium is circularly introduced into the cooling wrapping cover 8, and the cooling medium may be a cooling liquid or liquid nitrogen, which provides a low temperature environment for the low carbon hydrate powder, and the temperature range is usually between −10° C. and 5° C.; when the pressure of stored gas in the pulverizing chamber 2 is high (usually greater than 20 atmospheric pressures), a water cooling mode can be used directly. The low carbon gas hydrate in the device for pulverization and explosion suppression of a low carbon gas hydrate in the embodiment can be kept stable without being dissociated under the protection of the cooling wrapping cover 8 during the standing and pulverization.

Moreover, the compressed gas introduced into the pulverizing chamber 2 is subjected to adiabatic expansion to cause a cooling effect, and absorbs the heat generated by the pulverization of the low carbon hydrate, thereby further ensuring that the blocky low carbon gas hydrate can also be in a stable state during the pulverization process.

In another specific embodiment of the present invention, a cooling medium inlet 13 and a cooling medium outlet 14 are disposed on the cooling wrapping cover 8 of the device for pulverization and explosion suppression of a low carbon gas hydrate; the cooling medium inlet 13 and the cooling medium outlet 14 are connected with an outlet and an inlet of an external cooling medium storage box respectively, and the external cooling medium storage box continuously introduces the circularly-flowing low-temperature cooling medium into the cooling wrapping cover 8. The cooling medium inlet 13 and the cooling medium outlet 14 of the device for pulverization and explosion suppression of a low carbon gas hydrate are provided with a third valve 15 and a fourth valve 16 respectively.

In another specific embodiment of the present invention, in order to further improve the structural stability of the low carbon gas hydrate powder, the outer wall of the cooling wrapping cover 8 is provided with a heat insulation layer to maintain a stable low temperature environment in the annular pipe 1, the pulverizing chamber 2, the venturi 4, the nozzle 5, the entrainment chamber 6 and the feeding chamber 28.

In another specific embodiment of the present invention, one end of the gas-solid separation membrane 25 of the device for pulverization and explosion suppression of a low carbon gas hydrate is hinged to the inner wall of the discharging port, and the other end is clamped on the inner wall of the discharging port. During the preparation and storage of the low carbon hydrate, the gas introduced into the pulverizing chamber 2 through the feeding air pipe 12 meets a feeding pressure, the gas having the feeding pressure can carry the blocky low carbon hydrate to enter the pulverizing chamber 2, and the gas-solid separation membrane 25 is not opened under the action of the gas having the feeding pressure; when an explosion is triggered, the pulverizing air pipe 9 and the nozzle 5 are opened simultaneously, the pressure in the entrainment chamber 6 is drastically lowered, and the gas-solid separation membrane 25 can be opened upwards under the action of an up-and-down pressure differential.

In another specific embodiment of the present invention, in order to facilitate the adjustment of the size of the high-pressure high-speed airflow through the pulverizing air pipe 9 and the feeding air pipe 12, the device for pulverization and explosion suppression of a low carbon gas hydrate further includes an intake manifold 27, the pulverizing air pipe 9 and the feeding air pipe 12 are in communication with the intake manifold 27; the intake manifold 27 is provided with a first flow control instrument 21; in order to facilitate the adjustment of the size of the high-pressure high-speed airflow sprayed by the nozzle 5, the nozzle 5 is connected with a nozzle air pipe 10, and the nozzle air pipe 10 is provided with a fifth valve 17 and a second flow control instrument 22.

In another specific embodiment of the present invention, in order to facilitate the monitoring of the pressure during the secondary pulverization of the low carbon hydrate powder and the pressure before the spraying, a pressure sensor 23 is fixedly disposed on the inner wall of the venturi 4 of the device for pulverization and explosion suppression of a low carbon gas hydrate. Moreover, through the pressure sensor 23, whether the venturi 4 is clogged can also be determined, thereby facilitating the maintenance of the device.

In another specific embodiment of the present invention, one end of the switching valve 20 of the device for pulverization and explosion suppression of a low carbon gas hydrate is hinged to the inner wall of the feed port, and the other end is magnetically adsorbed and connected with the inner wall of the feed port. Introduced into the feeding chamber 28 from the position of the feeding air pipe 12, the airflow can switch on the switching valve 20 and bring the blocky low carbon gas hydrate in the feeding chamber 28 into the pulverizing chamber 2; after the feeding air pipe 12 stops the ventilation, the switching valve 20 is switched off under the action of gravity and is closely attracted to a magnetic block 26 on the inner wall of the feed port, and the switching valve 20 is made of a material that the magnetic block 26 can adsorb, or may be made of a magnetic material.

In another specific embodiment of the present invention, in order to facilitate the replacement of the disperser 3 and ensure the sealing performance of a joint, two ends of the venturi 4 of the device for pulverization and explosion suppression of a low carbon gas hydrate are in threaded connection with the entrainment chamber 6 and the disperser 3 respectively.

The first valve 18, the second valve 19, the third valve 15, the fourth valve 16 and the fifth valve 17 are PCL solenoid valves.

The specific use process of the device for pulverization and explosion suppression of a low carbon gas hydrate according to the present invention is illustrated by a specific embodiment:

The preparation and storage of hydrate powder: Under normal conditions, the device for pulverization and explosion suppression of a low carbon gas hydrate can achieve pre-pulverization and storage of the low carbon gas hydrate, the fifth valve 17 and the first valve 18 are switched off, the second valve 19 is switched on, the sealing cover 24 is opened, an airflow is introduced through the intake manifold 27 to enter the feeding air pipe 12 to switch on the tail end switching valve 20, the blocky low carbon gas hydrate placed through a placing port 7 is taken into the pulverizing chamber 2, and the introduced gas is discharged from the position of the disperser 3 through the entrainment chamber 6 and the venturi 4; after the blocky low carbon gas hydrate is introduced, the second valve 19 is switched off, the first valve 18 is switched on, the switching valve 20 is switched off under the action of gravity and is closely attracted to the magnetic block 26; meanwhile the sealing cover 24 is switched off, a high-pressure airflow is introduced into the annular pipe 1 to form a spiral airflow to pulverize the blocky low carbon hydrate in the pulverizing chamber 2, then the spiral airflow is discharged through the entrainment chamber 6, the venturi 4 and the disperser 3, and a small amount of entrained hydrate powder is filtered out by the gas-solid separation membrane 25.

Hydrate powder spray: When an explosion is triggered, an explosion detecting device in an environment where the device for pulverization and explosion suppression of a low carbon gas hydrate is located receives an explosion signal, and controls the nozzle 5 and the first valve 18 to be simultaneously switched on; the compressed gas enters the annular pipe 1 through the pulverizing air pipe 9, and converts pressure energy into kinetic energy through the 4 ventilation pipes 11 evenly distributed around the pulverizing chamber 2 and tangential to the inner side wall of the pulverizing chamber 2, to generate a high-speed airflow, so that the low carbon gas hydrate particles entering the pulverizing chamber 2 through the hydrate placing port 7 are subjected to mutual fierce collision and friction and collide with the surface of the inner chamber of the pulverizing chamber 2, thereby achieving the goal of ultrafine pulverization of the hydrate. The second flow control instrument 22 is disposed at the front end of the annular pipe 1 to control the speed at which the high-pressure high-speed airflow enters the pulverizing chamber 2, thereby adjusting the pulverization and collision strength of the low carbon hydrate. The first flow control instrument 21 can be used to adjust the velocity of the airflow sprayed at the position of the nozzle 5, thereby changing the secondary pulverization and spray speed of the low carbon hydrate powder in the venturi 4. The nozzle 5 sprays the high-speed airflow, the pressure in the entrainment chamber 6 is drastically lowered, and the gas-solid separation membrane 25 is opened upwards under the action of an up-and-down pressure differential; the low carbon hydrate powder is introduced to the position of the entrainment chamber 6 and is sprayed into the venturi 4 by the high-pressure airflow; the high-speed airflow in a throat pipe of the venturi 4 makes the hydrate powder subjected to fierce collision and pulverization again; the hydrate powder obtained after the pulverization is sprayed out of the outlet disperser 3 along with the airflow, and the powder particle size is in the range of 0.5-20 μm. The size of the spray range can be changed by adjusting the disperser 3.

It should be noted that the present invention does not limit the types of the first valve, the second valve, the third valve, the fourth valve, and the fifth valve as long as the on-off of a passage where the valves are located can be achieved; the number of the ventilation pipes set is also not limited as long as a spiral high-speed airflow can be formed in the pulverizing chamber; the low carbon gas hydrate in the present invention is specifically synthesized by $N_2$, $CO_2$, a halogen salt, dry water and water under a certain low temperature and high pressure condition; and the high-pressure gas for powder spraying is specifically an inert gas such as $N_2$ or $CO_2$. The pulverizing chamber can store gas hydrate particles having a volume being ¼ that of the pulverizing chamber and a particle diameter of about 30-50 mm.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A device for pulverization and explosion suppression of a low carbon gas hydrate, comprising:

a pulverizing chamber, wherein the pulverizing chamber is provided at the top thereof with a discharging port, and the discharging port is connected with an entrainment chamber;

a feeding chamber, wherein the feeding chamber is connected with a side wall of the pulverizing chamber, the feeding chamber is provided with a feeding port, the feeding port is provided with a sealing cover that can be opened or closed, the pulverizing chamber is in communication with the feeding chamber through a feed port, a switching valve is disposed at the position of the feed port, and the switching valve is used for opening or closing the feed port;

a pulverizing air pipe, wherein the pulverizing air pipe ventilates the pulverizing chamber, a high-speed airflow can be formed in the pulverizing chamber to pulverize a low carbon gas hydrate solid in the pulverizing chamber, the pulverizing air pipe is in communication with the feeding chamber through a feeding air pipe, and the pulverizing air pipe and the feeding air pipe are provided with a first valve and a second valve respectively;

a venturi, wherein two ends of the venturi are connected with the entrainment chamber and a disperser respectively, and the pulverizing chamber, the entrainment chamber, the venturi and the disperser are sequentially in communication with each other;

a nozzle, wherein the nozzle extends into the entrainment chamber and can spray an airflow into the entrainment chamber; and a gas-solid separation membrane, wherein the gas-solid separation membrane is disposed on the discharging port and used for preventing low carbon gas hydrate powder from entering the entrainment chamber from the pulverizing chamber, and when an explosion is triggered, the gas-solid separation membrane can be opened to make the low carbon gas hydrate powder enter the entrainment chamber from the pulverizing chamber under the action of the airflow.

2. The device for pulverization and explosion suppression of the low carbon gas hydrate according to claim 1, further comprising an annular pipe, wherein the annular pipe sleeves the pulverizing chamber, and the annular pipe is connected with the pulverizing air pipe; the annular pipe is in communication with the pulverizing chamber through a plurality of ventilation pipes, and the ventilation pipes are tangential to the inner side wall of the pulverizing chamber so that a spiral airflow can be formed in the pulverizing chamber.

3. The device for pulverization and explosion suppression of the low carbon gas hydrate according to claim 2, further comprising a cooling wrapping cover, wherein the cooling wrapping cover is filled with a cooling medium; and the cooling wrapping cover wraps the annular pipe, the pulverizing chamber, the venturi, the nozzle, the entrainment chamber and the feeding chamber to make the low carbon gas hydrate solid maintain a stable low temperature state.

4. The device for pulverization and explosion suppression of the low carbon gas hydrate according to claim 3, wherein a cooling medium inlet and a cooling medium outlet are disposed on the cooling wrapping cover; the cooling medium inlet and the cooling medium outlet are connected with an outlet and an inlet of an external cooling medium storage box respectively, and the cooling medium inlet and the cooling medium outlet are provided with a third valve and a fourth valve respectively.

5. The device for pulverization and explosion suppression of the low carbon gas hydrate according to claim 4, wherein the outer wall of the cooling wrapping cover is provided with a heat insulation layer.

6. The device for pulverization and explosion suppression of the low carbon gas hydrate according to claim 1, wherein one end of the gas-solid separation membrane is hinged to the inner wall of the discharging port, and the other end is clamped on the inner wall of the discharging port.

7. The device for pulverization and explosion suppression of the low carbon gas hydrate according to claim 1, further comprising an intake manifold, wherein the pulverizing air pipe and the feeding air pipe are in communication with the intake manifold; the intake manifold is provided with a first flow control instrument; the nozzle is connected with a nozzle air pipe, and the nozzle air pipe is provided with a fifth valve and a second flow control instrument.

8. The device for pulverization and explosion suppression of the low carbon gas hydrate according to claim 1, wherein a pressure sensor is fixedly disposed on the inner wall of the venturi.

9. The device for pulverization and explosion suppression of the low carbon gas hydrate according to claim 1, wherein one end of the switching valve is hinged to the inner wall of the feed port, and the other end is magnetically adsorbed and connected with the inner wall of the feed port.

10. The device for pulverization and explosion suppression of the low carbon gas hydrate according to claim 1, wherein the two ends of the venturi are in threaded connection with the entrainment chamber and the disperser respectively.

* * * * *